Patented Aug. 3, 1926.

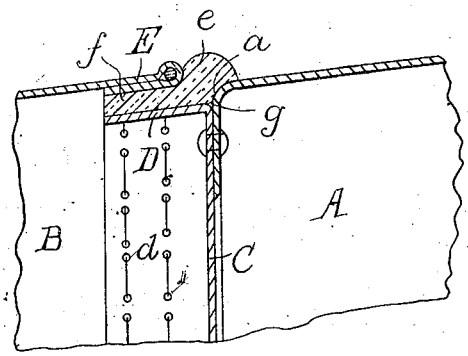
Fig. 1.
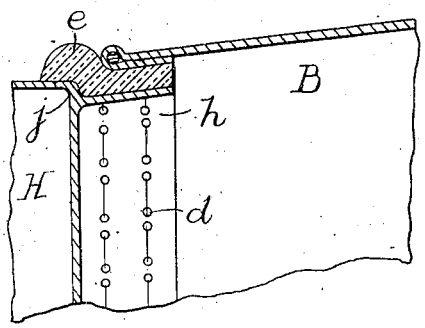
Fig. 2.

1,594,343

UNITED STATES PATENT OFFICE.

HERBERT AUSTIN, OF BROMSGROVE, ENGLAND.

HOOD BUFFER.

Application filed June 27, 1924, Serial No. 722,791, and in Great Britain July 10, 1923.

This invention relates to supporting the bonnets of motor vehicles; and has for its object to provide supports, of a very efficient, neat and inexpensive character, for preventing rattle and at the same time covering the joint between the bonnet and the dash or radiator.

According to the invention a cushion or strip of rubber, leather, or other elastic or soft material is provided in respect of the support at one or each end of the bonnet, one of such cushions being placed upon a flange, ledge or other part at the rear of the radiator, and the other on a flange, ledge or other part at the front of the dash, or forward end of the scuttle of the body. The section of the cushion is such that, while it provides a bed for the front or rear edge of the bonnet to rest upon in the usual way, it has also a shoulder against which the corresponding end of the bonnet may bear endwise to prevent movement in such direction.

The portion of the cushion where the shoulder is formed may be in the form of a beading and this latter may project rearwards or forwards, as the case may be; and pass to some extent over the outside of the body or radiator, and give a very neat appearance.

A practical embodiment of the invention is illustrated in the drawings herewith, of which:—

Figure 1 shows in longitudinal section the support for securing the rear end of the bonnet of a motor vehicle in relation to the forward end of the scuttle; and, Figure 2 shows the means for supporting the forward end of the bonnet from the radiator.

In Figure 1, A represents the scuttle and B the bonnet, C is a plate forming the front of the scuttle and is provided with a flange D, this flange being set in somewhat so as to leave a shoulder at $a$ at the fore end of the scuttle. E is a rubber strip formed with an outwardly extending bead $e$, a forwardly extending portion $f$ and a shoulder $g$ to butt up against the shoulder $a$ of the scuttle. The bonnet B rests upon the forwardly extending portion $f$ and is kept from rearward movement by bearing back against the bead $e$.

Figure 2 shows a rubber strip of identical construction to that shown in Figure 1 with similar means for securing it upon a rearwardly extending flange $h$ of a radiator H. The radiator has a shoulder $j$ which assists in preventing forward movement of the strip and the shoulder left behind the bead $e$ prevents forward movement of the bonnet.

A convenient means for securing the rubber strip upon the flange B or flange $h$ consists in providing them with a number of holes $d$ through which is passed a wire which also passes through the portion $f$ of the strip, but it will be readily understood that other methods of securing the strip upon the flange may equally well be utilized.

Having fully described my invention, what I claim and desire to secure by Letters Patent is:—

In combination with a motor vehicle hood and its cover, said hood having end plates and flanges projecting from said end plates toward each other and spaced within the periphery of said end plates, said cover being of less length than the distance between said end plates; of packing strips carried by said flanges to support the end edges of said cover, the under side of each packing strip having a shoulder formed therein facing in a direction opposite the first shoulder to bear against the respective end plate outside the flange, the packing strips bearing against the shoulders formed between the flanges and end plates, and having enlarged portions offset from the remainder and overlapping the end plates and forming shoulders to resist longitudinal movement of the cover.

In witness whereof I have hereunto signed my name this fourth day of June 1924.

HERBERT AUSTIN.